UNITED STATES PATENT OFFICE.

HIRAM DURYEA, OF NEW YORK, N. Y.

METHOD OF MANUFACTURING STARCH.

SPECIFICATION forming part of Letters Patent No. 301,436, dated July 1, 1884.

Application filed May 26, 1884. (No specimens.)

*To all whom it may concern:*

Be it known that I, HIRAM DURYEA, of New York, in the county of New York and State of New York, have invented a certain new and useful Improvement in the Method of Manufacturing Starch, of which the following is a specification.

My method relates to the manufacture of starch from corn or other grain. It enables starch to be produced more rapidly and at less expense than heretofore, and of as good or of a better quality.

The appliances or apparatus that I make use of may be generally the same as are usually employed in starch-factories, and do not therefore require to be especially described.

I first thoroughly steep the grain, then grind it by means of any suitable mills with water, and next subject the ground mass to the action of sieves or separators for the purpose of separating the husks and coarser matter of the grain from the fluid portion of the mass, which contains the starch and gluten, &c., and is known as "starch-water" or "starch-liquor." This starch-water is collected in a vat or vats and allowed to precipitate or condense, after which the supernatant water is drawn off. The condensed starch-water may then be conveyed to another vat or vats provided with agitators; or the collecting vat or vats may be provided with agitators, and the condensed starch-water may be allowed to remain there. In the vat or vats provided with agitators the starch-water is brought to a density of preferably about 11° Baumé by adding water. I then add to it a solution of caustic alkali, which, when the starch-water is of a density of about 11° Baumé, will preferably be of a density of about 7° Baumé. When the starch-water and the solution of caustic alkali are of about the density just named, I apply about four fluid ounces of the solution of caustic alkali to each gallon of the starch-water. If the density of the starch-water varies materially from that named, the density or quantity of the solution of alkali will be also varied as may be necessary for obtaining the desired result. After the application of the solution of alkali to the starch-water, I agitate the whole liquid preferably, say, not less than about four hours. This agitation may be continued longer, at the pleasure of the operator. The agitators or stirrers employed for this purpose may be of any suitable kind. The agitation being completed, I bring the liquor to a density of, say, about 9° Baumé by adding water, and then conduct it into a vat or vats provided in the sides with holes fitted with plugs, or with pipes, siphons, or equivalent means, wherein I allow the liquor to rest undisturbed for a period of from, say, twenty-four to forty-eight hours, more or less, according to circumstances, such as the depth of the vat, the quality of the water or of the grain, the temperature of the atmosphere, &c. At the end of this period it will be found that a large portion of the starch contained in the starch-liquor has subsided to the bottom of the vat or vats, and formed there a compact mass of comparatively solid and nearly or quite pure starch, while the gluten and other extraneous matter, with some starch entangled therewith, will be found in a thick solution immediately above it, and above all there will be a watery glutinous solution.

Instead of providing special vats wherein to effect the separation of the liquor into the strata described, I may produce the stratification by allowing it to rest for the necessary length of time in the vat or vats wherein it was previously agitated. In such case the vat or vats last referred to will be provided with holes fitted with plugs or cocks, or with pipes, siphons, or equivalent means. When the desired result has been secured, I draw off through the holes, cocks, pipes, siphons, or other means the supernatant watery fluid. After that I remove the thick glutinous solution containing some starch, and when this has been done I remove the deposit of starch from the bottom of the vat. The mass of starch may need no further treatment. It may, however, be washed. It can be finished in the usual manner. Nevertheless, if preferable, it may be broken up, dissolved in water, brought to a density of about 11° Baumé, varying somewhat according to circumstances, and again submitted to the operation of rest and subsidence to stratify it, in order to separate from the starch any gluten, &c., which, through carelessness in manipulations, may not have been eliminated previously.

In lieu of treating the mass of starch as described, it may be broken up, dissolved in water, run over starch-planes, and washed. If preferable, however, the starch may be broken up, dissolved in water, and treated by subsidence and decantation in cisterns before finishing it.

The before-referred-to stratum consisting of the thick glutinous solution is diluted with water, and may or may not be again treated with alkali. The resultant liquor is vigorously agitated to disentangle from the gluten, &c., any particles of starch that may be held thereby. This liquor is then run over the usual starch-planes or treated by subsidence and decantation in cisterns, in order that the starch remaining therein may be obtained. This starch may be subsequently treated in any desirable manner.

While the figures I have given for densities, quantities, and times have been found to be generally correct for securing the results named, they are not intended to be rigidly exact under all circumstances, but may be varied according to the character of the grain and water, the temperature and condition of the atmosphere, the depth of the vats, &c., such variations being made according to the judgment of the skilled operator.

It is well known that when, as by the old method, the whole of the "starch-water," previous to any separation, and while the starch is yet intimately mingled with the gluten and other extraneous matter, is run over the starch-plane, or treated by subsidence and decantation in cisterns, some of the gluten, &c., is apt to deposit with the starch and render it impure, while on the other hand an important percentage of starch is carried over the ends of the planes with the gluten, &c., necessitating further treatment for its recovery. By my process a very large proportion of pure or nearly pure starch is obtained by the first separation in the vat or vats, as described, requiring but little or no after-treatment for securing purity, and the glutinous residue, when treated as described, readily yields up the starch that remains in it, ready for finishing in the usual way.

My process is novel and remarkable for the invariable promptness with which, by reason of the treatment I have described, a large portion of the starch in the liquor is deposited in a pure or nearly pure and compact condition in the vat or vats in the first instance, and the facility with which the starch remaining in the glutinous residue after the first operation of rest and subsidence may be obtained.

What I claim as my invention, and desire to secure by Letters Patent, is—

1. In the process of manufacturing starch from grain, grinding the grain with water, separating the husks and coarser matter from the starch-water, condensing the starch-water, combining a solution of caustic alkali with the condensed starch-water at substantially the densities named, agitating the resultant liquor preferably not less than about four hours, allowing the liquor to settle from, say, about twenty-four to forty-eight hours, for the purpose of effecting a separation of the liquor into a stratum of comparatively solid nearly or quite pure starch and glutinous solutions, removing the glutinous solutions and the starch separately, substantially as specified.

2. In the process of manufacturing starch from grain, grinding the grain with water, separating the husks and coarser matter from the starch-water, condensing the starch-water, combining a solution of caustic alkali with the condensed starch-water at substantially the densities named, agitating the resultant liquor, allowing the liquor to settle so as to effect its separation into a stratum of comparatively solid nearly or quite pure starch, a superposed thick glutinous solution, and a top watery glutinous solution, drawing off the glutinous solutions, diluting the thick glutinous solution with water, vigorously agitating the resultant liquor, so as to disentangle from the gluten, &c., any particles of starch that may be held thereby, and subsequently separating the starch from the gluten, &c., substantially as specified.

HIRAM DURYEA.

Witnesses:
T. J. KEANE,
E. T. ROCHE.